April 29, 1924.
S. T. SJOBERG
1,492,226
COMBINATION LOCOMOTIVE AND COACH HOIST
Original Filed May 7, 1921
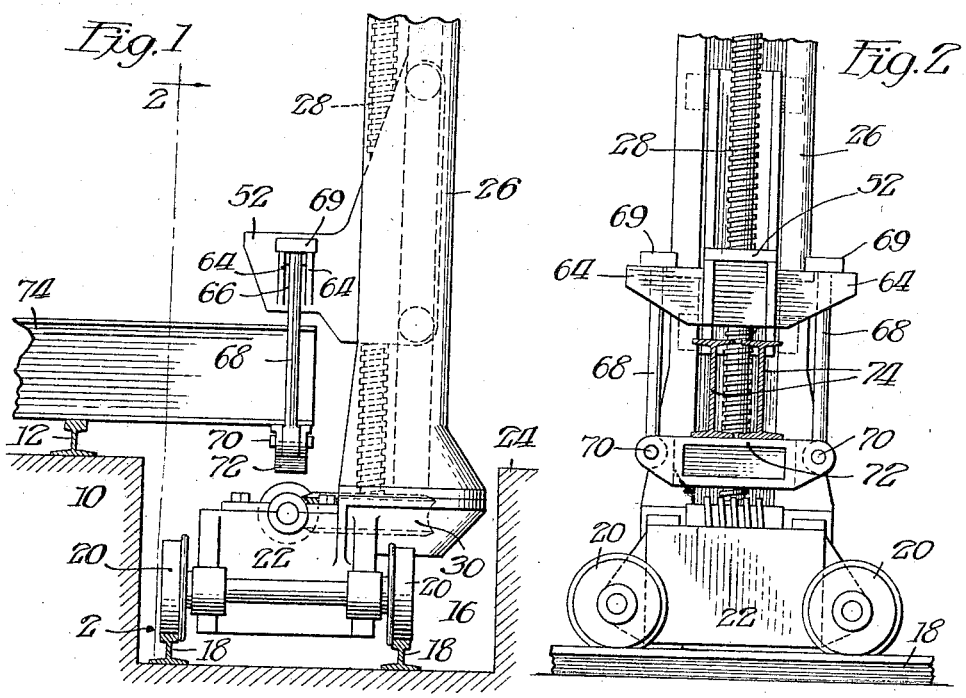
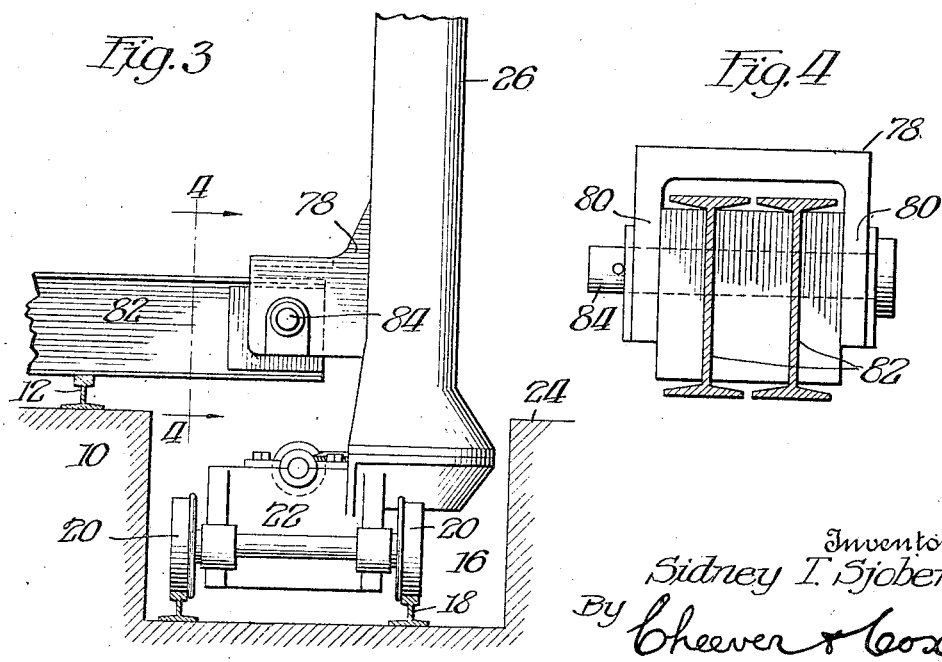
Inventor:
Sidney T. Sjoberg.
By Cheever & Cox
Attorneys Patented Apr. 29, 1924.

1,492,226

UNITED STATES PATENT OFFICE.

SIDNEY T. SJOBERG, OF CHICAGO, ILLINOIS.

COMBINATION LOCOMOTIVE AND COACH HOIST.

Original application filed May 7, 1921, Serial No. 467,734. Patent No. 1,438,341, dated December 12, 1922. Divided and this application filed December 6, 1922. Serial No. 605,320.

*To all whom it may concern:*

Be it known that I, SIDNEY T. SJOBERG, a citizen of the United States, residing at Chicago, in the county of Cook and State of Illinois, have invented a certain new and useful Improvement in Combination Locomotive and Coach Hoists, of which the following is a specification.

This is a division of my prior application, Serial Number 467,734 filed May 7, 1921, issued as Patent 1,438,341 on December 12, 1922.

This invention relates to mechanism adapted for installation in car shops, selectively usable for lifting car bodies, which ordinarily neither require nor permit the use of a cross beam or girder under the car body, off from the car truck or for lifting a locomotive which because of its weight necessarily requires a cross girder extending over the rails and under the locomotive body.

The parent application, #467,734 referred to above shows a device in which a cross beam under the load to be lifted is carried on the tops of oppositely disposed hooks, adapted to normally hook under a car body or the like, sustained and moved up and down by truck or trolley mechanism traveling in pits on opposite sides of the main track on which the car or locomotive to be lifted is located.

The object of this particular invention is to provide means for so suspending the cross beam under the load from the hooks that the top of the beam is at least as low as and preferably lower than the tops of the hooks, thereby reducing the depths of the pits in which the trucks or trolleys travel; with consequent saving in cost and other advantages unnecessary to detail here.

The invention consists in means for carrying out the foregoing and other objects which can be easily and cheaply made, which is satisfactory in use, and is not readily liable to get out of order. More particularly, the invention consists in features and details of construction hereafter more fully set forth in the specification and claims.

Referring to the drawings in which similar numerals represent similar parts throughout the several views:

Figure 1 is a side view showing in section a fraction of a central foundation carrying the rails on which the car or locomotive to be operated on travels, the same bordered on opposite sides by truck pits (only one shown).

Figure 2 is a side view of the mechanism of Figure 1 taken on approximately the line 2—2 of that figure.

Figure 3 is a view corresponding to Figure 1 of a modified form of device.

Figure 4 is a detail side view taken on the line 4—4 of Figure 3.

In carrying out this invention, the designer of the repair shop or other locality where the device is to be used, provides a concrete or other suitable base structure having a central portion 10 suitably supporting track rails 12 on which car or locomotive wheels (not shown) are adapted to travel and having on each side, outside the rails 12, suitably shaped and proportioned pits 16 carrying at their bottoms track rails 18 on which truck wheels 20 of the load lifting trucks 22 are adapted to travel parallel to the railroad rails 12. Outside of the pit 16 the constructor usually forms a working floor 24 in general on a level with the rails 12.

At least four trucks 22 should be ordinarily provided, two on the rails 18 on each side of the rails 12, one at each end of the car or locomotive. Conventionally rising from these trucks 22 are vertical masts 26 within which are lifting screws 28 suitably driven by any suitable means as for instance worm wheel mechanism 30, without novelty herein. Each lifting screw 28 is conventionally adapted to elevate and depress laterally projecting load carrying hooks 52 or 78, as the case may be. Each hook is adapted to have suspended from it the end of a cross beam 74 or 82, as the case may be, insertable over the rails 12, under the load to be lifted to directly engage some part of the load, say locomotive, to lift it off from its normal supporting mechanism.

In the form of the device shown in Figures 1 and 2, hook 52, designed to, if desired, hook directly under the side of a car or the like, is provided on opposite sides with parallel spaced apart hooks 64, having between them U-shaped notches 66 entered by bolts 68 pivotally connected at 70 to a cross girder 72 passing under and supporting an adjacent end of the beam 74. The heads 69 of the bolts engage the tops of the hooks 64 and carry the load from them.

In the construction of Figures 3 and 4, the hooks 52—64 are replaced by hooks 78, made of inverted U-shaped construction, as clearly shown in Figure 4, so that the side walls 80 of the hooks pass down over the beam 82 of this construction, and are secured thereto by transverse bolt 84. This feature of the invention is shown, described and claimed in divisional application, Serial Number 665,322, filed September 28, 1923.

In both of these constructions, the pits 16 do not have to be as deep as in the construction shown and described in said original application #467,734. One method of operating either device is to assemble in front of or behind the object to be lifted a pair of jack mechanisms as shown with an intervening beam 74 or 82, as the case may be, suspended from its hooks, then, by means not entering into this invention, move the truck bodies 22, carrying the beam to proper position under the locomotive, and finally by mechanism not entering into this invention, manipulate the screws 28 to elevate the beam and consequently the load.

Having thus described my invention, what I claim as new and desire to secure by Letters Patent, is:

1. In mechanism of the class described, a base having on opposite sides thereof parallel pits, railroad car tracks on the base, truck carrying tracks in the pits, parallel to the railroad rails, a jack carrying truck on each of the last mentioned tracks, a jack mechanism on each truck, a hook on each jack mechanism movable vertically, and normally adapted to hook under the edge of a car body of a car traveling on the railroad tracks, a beam insertable across the railroad tracks and supported by said hooks with the top of the beam at least as low as the tops of said hooks, the whole being so arranged and proportioned that the load carrying hooks can descend far enough so that the beam practically contacts the railroad track rails.

2. In mechanism of the class described, a base having on opposite sides thereof parallel pits, railroad car tracks on the base, truck carrying tracks in the pits, parallel to the railroad rails, a jack carrying truck on each of the last mentioned tracks, a jack mechanism on each truck, a hook on each jack mechanism movable vertically, and normally adapted to hook under the edge of a car body of a car traveling on the railroad tracks, a beam insertable across the railroad tracks and supported by said hooks, with the top of the beam substantially below the tops of said hooks, the whole being so arranged and proportioned that the load carrying hooks can descend far enough so that the beam practically contacts the railroad track rails.

3. In mechanism of the class described, a vertical mast, a lifting hook reciprocatable up and down said mast, a beam extending laterally from the mast, a suspending rod from the beam adapted to engage the hook to connect the beam thereto.

4. In mechanism of the class described, a vertical mast, a load lifting hook reciprocatable vertically of the mast, a pair of separated lugs projecting from opposite sides of the hook, a beam below the hook, bolts pivotally mounted on opposite sides of the beam, extending upward and entering recesses on the sides of the hook to suspend the beam from the hook, for the purposes set forth.

In witness whereof, I have hereunto subscribed my name.

SIDNEY T. SJOBERG.